(12) United States Patent
Vasilj et al.

(10) Patent No.: US 9,493,124 B2
(45) Date of Patent: Nov. 15, 2016

(54) METHOD FOR MANUFACTURING AN INTERIOR TRIM COMPONENT

(75) Inventors: Ante Vasilj, Kaiserslautern (DE);
Frederik Bois, Strasbourg (FR);
Pierre-Olivier Moraes, Drusenheim (FR); Bernhard Baumann, Lustadt (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 528 days.

(21) Appl. No.: 13/522,989

(22) PCT Filed: Jan. 19, 2011

(86) PCT No.: PCT/EP2011/000206
§ 371 (c)(1),
(2), (4) Date: Jul. 19, 2012

(87) PCT Pub. No.: WO2011/088995
PCT Pub. Date: Jul. 28, 2011

(65) Prior Publication Data
US 2012/0286444 A1   Nov. 15, 2012

(30) Foreign Application Priority Data

Jan. 19, 2010   (DE) .................. 10 2010 005 009

(51) Int. Cl.
*B32B 3/10*   (2006.01)
*B60R 13/02*   (2006.01)
*B29C 44/08*   (2006.01)
*B29C 44/12*   (2006.01)
(Continued)

(52) U.S. Cl.
CPC ............... *B60R 13/02* (2013.01); *B29C 44/08* (2013.01); *B29C 44/1233* (2013.01); *B29C 45/1671* (2013.01); *B29C 45/1418* (2013.01); *B29K 2105/04* (2013.01); *B29L 2031/3041* (2013.01); *Y10T 428/24479* (2015.01)

(58) Field of Classification Search
CPC .............. B29C 44/1228; B29C 44/08; B29C 44/1233; B29C 45/1671; B29C 45/1418; B60R 13/02; Y10T 428/24479; B29K 2105/04; B29L 2031/3041
USPC ....................................................... 264/46.5
See application file for complete search history.

(56) References Cited

U.S. PATENT DOCUMENTS 3,075,862 A * 1/1963 Hoyer .................. B29C 63/02
156/216
4,779,390 A 10/1988 Repper et al.
(Continued)

FOREIGN PATENT DOCUMENTS

DE         3930603         9/1989
DE      102005024776      12/2006
(Continued)

OTHER PUBLICATIONS

International Search Report for PCT/EP2011/000206, May 23, 2011, 4 pages (translated).
(Continued)

*Primary Examiner* — Galen Hauth
(74) *Attorney, Agent, or Firm* — Reising Ethington P.C.

(57) ABSTRACT

The invention pertains to a method for manufacturing an interior trim component that features a special injection molding process and a selective back-foaming process.

8 Claims, 6 Drawing Sheets

(51) Int. Cl.
  *B29C 45/16* (2006.01)
  *B29C 45/14* (2006.01)
  *B29K 105/04* (2006.01)
  *B29L 31/30* (2006.01)

(56) References Cited

U.S. PATENT DOCUMENTS

| | | | |
|---|---|---|---|
| 4,923,539 A | | 5/1990 | Spengler et al. |
| 5,096,639 A | * | 3/1992 | Hughes ............ 264/46.5 |
| 5,462,786 A | * | 10/1995 | Van Ert ............ B29C 43/18 |
| | | | 156/212 |
| 5,500,168 A | | 3/1996 | Suzuki |
| 5,582,789 A | | 12/1996 | Stein et al. |
| 5,656,675 A | * | 8/1997 | Kobayashi et al. ............ 521/79 |
| 5,811,053 A | * | 9/1998 | Ota et al. ............ 264/511 |
| 2004/0094856 A1 | | 5/2004 | Delcros |
| 2005/0025954 A1 | * | 2/2005 | Sullivan et al. ............ 428/304.4 |
| 2005/0064178 A1 | * | 3/2005 | Gray et al. ............ 428/327 |
| 2005/0276874 A1 | | 12/2005 | Menaldo et al. |
| 2006/0127636 A1 | | 6/2006 | Bondar et al. |
| 2007/0029829 A1 | * | 2/2007 | Johnson et al. ............ 296/1.08 |
| 2007/0036946 A1 | | 2/2007 | Muller et al. |
| 2007/0054116 A1 | | 3/2007 | Neitzke |
| 2009/0130401 A1 | * | 5/2009 | Paruchuri ............ B60R 13/0243 |
| | | | 428/195.1 |

FOREIGN PATENT DOCUMENTS

| | | |
|---|---|---|
| EP | 1995034 | 11/2008 |
| FR | 2854591 | 11/2004 |
| FR | 2878463 | 6/2006 |
| GB | 2401343 | 11/2004 |
| JP | H05162169 A | 6/1993 |
| JP | 9076256 | 3/1997 |
| JP | 2001353746 A | 12/2001 |
| JP | 2002120012 A | 4/2002 |
| JP | 2005125736 A | 5/2005 |
| JP | 2006020025 | 1/2006 |
| JP | 2006525888 | 11/2006 |
| JP | 2007522958 A | 8/2007 |
| JP | 2007532364 A | 11/2007 |
| JP | 2010166371 A | 7/2010 |

OTHER PUBLICATIONS

S. Y. Yang and S.H. Parng, "Injection Molding of Ribbed Plastic Plates with a Superplastic Zn-22% Al Sheet", Advances in Polymer Technology, Wiley and Sons, vol. 20, No. 3., (2001), pp. 216-225, 10 pages.

* cited by examiner

METHOD FOR MANUFACTURING AN INTERIOR TRIM COMPONENT

TECHNICAL FIELD

The invention pertains to a method for manufacturing an interior trim component, particularly for the interior of vehicles.

BACKGROUND

An injection method and a compression molding method for manufacturing molded parts are known from EP 1 995 034 A2.

SUMMARY

It is the objective of the present invention to make available a method, by means of which the costs for manufacturing interior trim components with a design of seemingly superior quality can be reduced.

The aforementioned objective is attained with a method with the characteristics of the independent claims. Other embodiments are defined in the dependent claims that refer to these independent claims.

The inventive method for manufacturing an interior trim component features, in particular, the following steps:
  optionally placing a film into a first molding tool part, wherein the film extends at least over a coverage area of the first molding tool part,
  fixing the film in the first molding tool part,
  closing the mold with at least one second molding tool part,
  carrying out the injection molding process into the volume between the film and the at least one second molding tool part in order to produce a first trim component section,
  removing and combining the first trim component section with a second trim component section, and
  selectively back-foaming the second trim component section.

According to the inventive method, it is proposed, in particular, to carry out the following steps in order to manufacture an interior trim component:
  placing a film (20) onto a first contouring surface (36) of a first molding tool part (32) and fixing the film (20) on the first molding tool part (32),
  fixing the film (20) on the first molding tool part (32),
  arranging a second molding tool part (34) with a second contouring surface (37) on the first molding tool part (32) in order to realize a closed position relative to one another, wherein the second contouring surface (37) is realized in such a way that it at least regionally extends over the first contouring surface (36) of the first molding tool part (32) in its planar expanse and the first and the second contouring surface (36, 37) jointly form a cavity (39) in the closed position of the molding tool parts (32, 34), wherein said cavity lies between said contouring surfaces and serves for accommodating material to be injected for the at least sectional in-mold lamination of the film (20),
  carrying out the injection molding process into the cavity (39) between the film (20) and the at least one second molding tool part (32) in order to produce a first trim component section (12) of film and curing the supporting structure and removing the supporting structure with the film (20) connected thereto as first trim component section (12),
  arranging a second trim component section (14) with an outer side (14a) that is sectionally realized in the form of a visible face and a rear side (14b) that lies opposite of the outer side in such a way that the trim component section (14) forms a first exposed visible face section (15) and a connecting section (16) that is in contact with a connecting section (26) of the film (29) on the outer side (14a) and a cavity (H2) for at least sectionally back-foaming and connecting the first and the second trim component section (12, 14) is sectionally formed between the rear side (14b) of the second trim component section (14) and the first trim component section (12), and
  sectionally back-foaming and connecting the first and the second trim component section (12, 14).

According to an embodiment of the inventive method, no insertion of a film takes place. In this case, the additional steps are carried out without a film, but with the same measures.

According to an embodiment of the inventive method, it is furthermore proposed that the film is provided with cutouts and/or at least one weakening line that, when the film is placed into the mold, corresponds to at least one elevation or depression in the contouring surface of at least one of the molding tool parts, and that the region, in which at least part of the elevation or the depression forms, is removed in order to form an opening in the interior trim component to be manufactured.

In order to manufacture interior trim components, a first trim component section in the form of an injection-molded part generally is manufactured in a first step in an injection molding process and this first trim component section is combined with a second trim component section in a second step. The injection-molded part may be manufactured of a polypropylene material. If such a method is used for the instrument panels of motor vehicles, the injection-molded part is, in a manner of speaking, used as support for the instrument panel while the second trim component section features an optically and also haptically appealing material and covers at least part of this support in the form of the first trim component section. For example, the second trim component section may form the border of display elements for revolutions per minute, speed or consumption. The first interior trim component section features a supporting structure and a film that at least sectionally covers or laminates this supporting structure and lies in a region that is situated father from the passenger area or seating area in the interior during the installation of the interior trim component into the vehicle, namely between the first interior trim component section and the connecting point of the front windshield to the car body or the second interior trim component section in the case of an instrument panel, wherein the second interior trim component section lies at least in the region that is situated somewhat closer to the passengers. Due to these measures, the supporting element can be manufactured of a suitable material with respect to the required stability and the film only needs to be used for the region that remains particularly visible for the driver of a motor vehicle after the installation. This nevertheless results in an altogether attractive interior trim component that is also pleasant in haptical respects in the access area of the passengers. The outer side of the first interior trim component section, particularly with the film, may be realized in an only slightly reflective and dull fashion if the film is chosen accordingly such that the view of the driver of the motor vehicle is not restricted by reflections. Particularly the granulated area of the interior trim component is shiny and reflective due to the conventional and cost-efficient manufacturing methods. Since the film may be arranged in such a way that it lies at the windshield and is set back in the visible hard area, i.e., "concealed," it is possible to utilize PP GF material types or LGF material types in order to improve the stability of the supporting structure and to further reduce the costs.

An inventive method therefore essentially features two main steps. In the first step, a special injection molding process is carried out while selective back-foaming takes place in the second step. The injection molding process is special with respect to the fact that no simple injection-molded part is produced as it is the case with known methods, but a film is rather fixed in the injection mold prior to the injection molding process. This film is optimized in such a way that it has a dull surface in comparison with the bare injection molding material and, in particular, is antireflective at least on the side that is subsequently visible for the passengers of a motor vehicle. This film also has an improved contact behavior with respect to its haptics. This improved contact behavior refers, for example, to the contact resistance, the contact temperature or the surface texture.

In summary, it can therefore be said that the inserted film improves the optical and haptical properties of the first trim component section produced by means of the injection molding process on the visible face after its subsequent installation, for example, as an instrument panel. In this respect, it is important that the injection molding process is carried out in such a way that the side of the film that subsequently lies on the visible face is already defined when the film is placed into the first molding tool part. This is ensured due to the fact that the film is subjected to in-mold lamination only, i.e., that only the volume between the film and the second molding tool part is filled with injection molding material.

After the completion of the injection molding process, a first trim component section is available in the form of a semifinished product or, in other words, intermediate product that features a supporting structure of injection molding material and a cover part in the form of the film that is present in at least a few sections. In this case, the sections, over which the film extends, i.e., the coverage areas, particularly comprise the areas that are visible for the passengers of a motor vehicle in combination with the second trim component section after the installation into such a motor vehicle, for example, as an instrument panel.

Selective back-foaming of the second trim component section is carried out in the second step of the inventive method. During this process, the first and the second trim component section are advantageously combined in such a way that the second trim component section covers the very areas that are not covered by the film. In order to obtain particularly clean transitions, it may be advantageous if areas with the film and areas of the first trim component section that are covered by the second trim component section intersect such that the subjacent material of the injection-molded part also is not directly visible at the intersecting points.

The selective back-foaming of the second trim component section is advantageously carried out through the first trim component section in this case. For example, the first trim component section is provided with openings, through which the selective back-foaming can take place. The selective back-foaming has the purpose of improving the haptics of the second trim component section for the user. The back-foaming makes it possible to provide the second trim component section with very soft haptics. The combination of the two inventive steps therefore result in an interior trim component that is optimized with respect to its optical properties, as well as its haptical properties, wherein optimizations are realized on the first trim component section and on the second trim component section. In the synopsis of the two improved individual steps, an altogether enhanced interior trim component for the user is created, namely without any indication of the two individual steps on the visible face of the interior trim component. For the passengers of a motor vehicle, the entire interior trim component rather seems to have a high quality in optical and haptical respects.

An inventive method can be additionally developed in such a way that the film has a haptically and/or optically optimized surface at least on the first side that faces the first molding tool part. In this context, a haptical optimization means that a sense of quality or the impression of high quality is created when the user touches the surface. This intrinsic value refers, in particular, to the material quality that should be clearly distinguishable from classic smooth plastic. It may be realized, for example, with an improved contact temperature, with a reduced or increased surface roughness or even with the surface resistance characteristics. In this context, an "optical optimization" refers, for example, to a surface that has a dull or antireflective optical appearance. In addition to its high-quality appearance for the user, such a dull surface also provides the advantage that it prevents a reflection of incident sunlight into the area of the driver and therefore also improves the safety while driving the motor vehicle.

It may furthermore be advantageous if the selective back-foaming step of an inventive method is carried out into an intermediate space between the first trim component section and the second trim component section through the first trim component section. In this way, the first trim component section simultaneously forms the boundary for the selective back-foaming. In order to ensure that the back-foaming material also has a sufficient adhesion on the first trim component section, it may be advantageous to subject, in particular, the area that is not covered with the film to a flame treatment prior to the back-foaming process. In this way, the surface of the first trim component section is altered due to the flame treatment such that the back-foaming material has a superior adhesion. At this location, the effect of the flame treatment on the surface of the film is irrelevant because this location is not visible for the passengers of a motor vehicle, into which a correspondingly manufactured instrument panel is installed, due to the intersection with the second trim component section. However, a mask or a stencil needs to be used for the flame treatment in order to protect the area that will subsequently be visible in the vehicle from the effects of the flame treatment. The selective back-foaming into an intermediate space has the additional advantage that relatively little back-foaming material needs to be used. In this respect, it suffices to utilize the minimum quantity of back-foaming material required for achieving the desired haptics and for supporting the first trim component section relative to the second trim component section when pressure is exerted thereupon by the user. Without this intermediate space between the first and the second trim component section and a corresponding back-foaming process, it would be necessary to inject back-foaming material into a significantly larger volume such that not only the expenditure of time for the back-foaming process would be increased, but also the costs due to the additional material required.

It may furthermore be advantageous if the film is pressed against the first molding tool part due to the injection molding process such that at least the surface of the first side of the film that faces this molding tool part is deformed in a plastic fashion. In this way, the inventive method is even further optimized with respect to the injection molding step. This means that the final surface of the film on the visible face is not formed until the injection molding process. This surface formation is an integral part of the injection molding step. Due to the pressure built up by the injection molding process on the rear side, i.e., the second side of the film, this film is pressed into the first molding tool part sufficiently strong for impressing the negative surface pattern of the first molding tool part into the surface of the first side of the film. This surface may be designed in different ways. For example, it is possible to adapt the surface structure to granulated leather such that the film not only has a dull and antireflective optical appearance, but also appears to have a high quality. Other surface structures with a high-quality effect such as, for example, brushed metal, carbon structures or other technical structures may also be realized in this case.

In order to ensure that the film can be removed from the mold as easily as possible and pressed into the lower molding tool part as cleanly as possible during the injection molding process, i.e., with the least possible creasing of the film, it may be advantageous if the plastic deformation is produced with a first molding tool part, the negative surface structure depth of which is 10% to 30% greater than the positive surface structure depth to be produced on the first trim component section. When using a foil thickness between 0.2 mm and 0.7 mm, it is possible that the desired surface structure is not produced with high quality on the visible face of the first trim component section by means of the injection molding process. In order to ensure that the surface structure has the desired quality and definition, in particular, with respect to the surface structure depth such as, for example, the granulation depth, the negative surface structure needs to be chosen correspondingly coarser. In this case, it was surprisingly determined that a film with a thickness between 0.2 mm and 0.7 mm compensates an increase of the negative surface structure of the first molding tool part by 10% to 30% and provides a high-quality surface appearance. In other words, 110% to 130% of the desired positive surface structure depth of the first trim component section are used for the negative surface structure depth of the first molding tool part in accordance with the invention.

In this way, the reject rate of the injection-molded parts, i.e., of the first component trim sections, is minimized and the attainable optical appearance of the surface of the film also is additionally improved.

It may be advantageous to utilize the materials PP-GF or PP-LGF for the injection molding process in an inventive method. In this case, PPGF signifies glass fiber-reinforced polypropylene with normal or short fibers (</=5 mm) while PP LGF signifies polypropylene with long glass fibers (>5 mm). Only an inventive method makes it possible to utilize glass fiber-reinforced polypropylene in the injection molding process for the first trim component section. Materials of this type are very unsightly with respect to their optical appearance and perceived as materials of inferior quality by the user. However, they simultaneously make it possible to achieve a high stability with respect to mechanical loads with relatively little material input. The optical inferiority of a material used, in particular, in the construction of motor vehicles nevertheless has a significant influence on the valuation and qualitative assessment of the motor vehicle by the user such that a material of this type could not be used until now. Only the utilization of an inventive method makes it possible to utilize a more stable material of this type and to thusly achieve a greater stability with less material input, as well as the appearance of a high-quality material for the passengers of the motor vehicle.

It may furthermore be advantageous if the film features a layer of TPO at least on the first side that faces the first molding tool part. In this context, TPO refers to a thermoplastic, particularly a thermoplastic on the basis of olefin. The utilization of thermoplastics has the advantage that energy in the form of heat is supplied into the molding tool parts while the injection molding process is carried out by the injection molding material required for the injection molding process. In addition to the fact that the injection molding material occupies volumes and therefore presses the film against the lower molding tool part, the film can be partially fused or softened at least in certain areas due to the supplied energy and the thermoplastic design of the film. This softening simplifies the plastic deformation of the film surface in order to produce a structured surface on the visible face of the film. After the completion of the injection molding process, particularly after the cooling of the injection molding material, the mold and the film surface also cool down. The surface structure of the film that was, in a manner of speaking, produced indirectly due to the injection molding process also cools down and remains rigid and at least plastically unchangeable for the temperature ranges occurring during its utilization.

In order to ensure that the film remains in a defined position during the injection molding process, it may be advantageous to fix the film in the first molding tool part before the mold is closed. In such a fixing process, it is important that the film adheres sufficiently strong to a location while leaving sufficient free space for the film to move into the final position. This final position is defined by the lower molding tool part, into which the inserted film is moved and, in particular, pressed during the injection molding process due to the injection of the injection molding material. If the film is fixed excessively strong, the film may expand such that different film thicknesses would be created or the film may even tear such that the first trim component section being produced would have to be rejected.

In the inventive method, the fixing of the films may be realized in different ways. It would be possible, for example, to fix the film with the aid of fixing device in the form of adhesive or cohesive adhesives. The utilization of such adhesives is particularly sensible if the film has complex geometries and the film needs to be fixed at a plurality of locations. The fixing by means of an adhesive is preferably realized in such a way that the adhesive can be easily removed from the first trim component section, particularly from the film, after the completion of the injection molding process. It is furthermore advantageous if the adhesive is arranged in such a way that it does not impair the formation of the film surface structure during the injection molding process.

As an alternative or in addition to the utilization of adhesives, it may be advantageous to provide fixing device in the form of clamping device. A clamping device of this type may comprise, for example, mechanical pins or even clamps for fixing the position of the film. In this case, mechanical pins may correspond, for example, to recesses or holes in the film while clamps can clamp the film in position at the edge thereof. In this case, it is decisive that neither the holes nor the clamps affect the final shape of the first trim component section and the surface structure of the film. It may be advantageous to arrange the fixing device in the form of clamping device outside the areas of the interior trim component that are visible after the manufacture thereof. It would be possible, in particular, to realize an overlap of the film, wherein the clamping device are arranged in the overlapping areas such that possible damages caused by the clamping device can be subsequently removed together with these areas. It would also be conceivable to fix the film by means of a vacuum, wherein the fixing device are realized in the form of suction holes for the film that fix the film in a defined position.

In order to even better adapt the film, it may be advantageous if the film is provided with cutouts that correspond to elevations or depressions of at least one of the molding tool parts when the film is placed into the mold. For example, these cutouts are frequently provided in the area of the film, in which the interior trim component can be used for producing fixtures or openings on instrument panels of motor vehicles for loudspeakers or ventilation ducts. Particularly the ventilation system for the front windshield usually requires openings in exactly this area. These openings are advantageously realized in the two molding tool parts in the form of depressions or elevations such that only very thin material bridges in the form of predetermined breaking points remain in these areas or these areas are not injected with injection molding material. The film is advantageously provided with similar cutouts in these areas, wherein this is associated with the additional advantage that—if elevations are provided in the molding tool part and corresponding cutouts are provided in the film—these elevations can also fulfill the function of a fixing device for the film.

In order to additionally optimize the injection molding process, it may be advantageous to provide air channels in the first molding tool part in order to generate a vacuum in the space between the film and the first molding tool part. This has the advantage that creasing is even further minimized or even completely prevented during the manufacture of the first trim component section. In this case, the volume between the first molding tool part and the film is slowly evacuated via the air channels during the injection molding process, i.e., while liquid injection molding material flows into the volume between the film and the second molding tool part. Due to the evacuation, the applied vacuum promotes the movement of the film in the direction of this first molding tool part. Consequently, the first film is pulled against the first molding tool part due to the vacuum on the one hand and pressed against the first side from the rear by inflowing injection molding material on the other hand. Due to these measures, it is also possible to operate with lower injection molding pressures and to obtain a product of higher quality. This also makes it possible to generate higher deformation pressures between the film and the first molding tool part and to thusly achieve a superior and more accurate plastic deformation of the upper side of the film.

Another object of the present invention is a device for carrying out an inventive method. Such a device features corresponding elements for the required steps. Particularly an injection mold with at least two molding tool parts, as well as a second device for carrying out the selective back-foaming step, is required.

In an inventive device, particularly the first molding tool part is realized in such a way that only radii greater than or equal to 0.5 mm are provided. Since only radii of this size are provided, the removal of the first trim component section from the first molding tool part is simplified and the risk of the formation of creases in the film during the injection molding process is reduced.

Yet another object of the present invention is an interior trim component manufactured with a method according to the present invention.

BRIEF DESCRIPTION OF THE DRAWINGS

The invention is described in greater detail below with reference to the attached drawings. In this respect, the terms "bottom," "top," "left" and "right" refer to the orientation of the figures with normally legible reference symbols. In these drawings.

DETAILED DESCRIPTION OF THE ILLUSTRATED EMBODIMENT(S)

Figure 1:
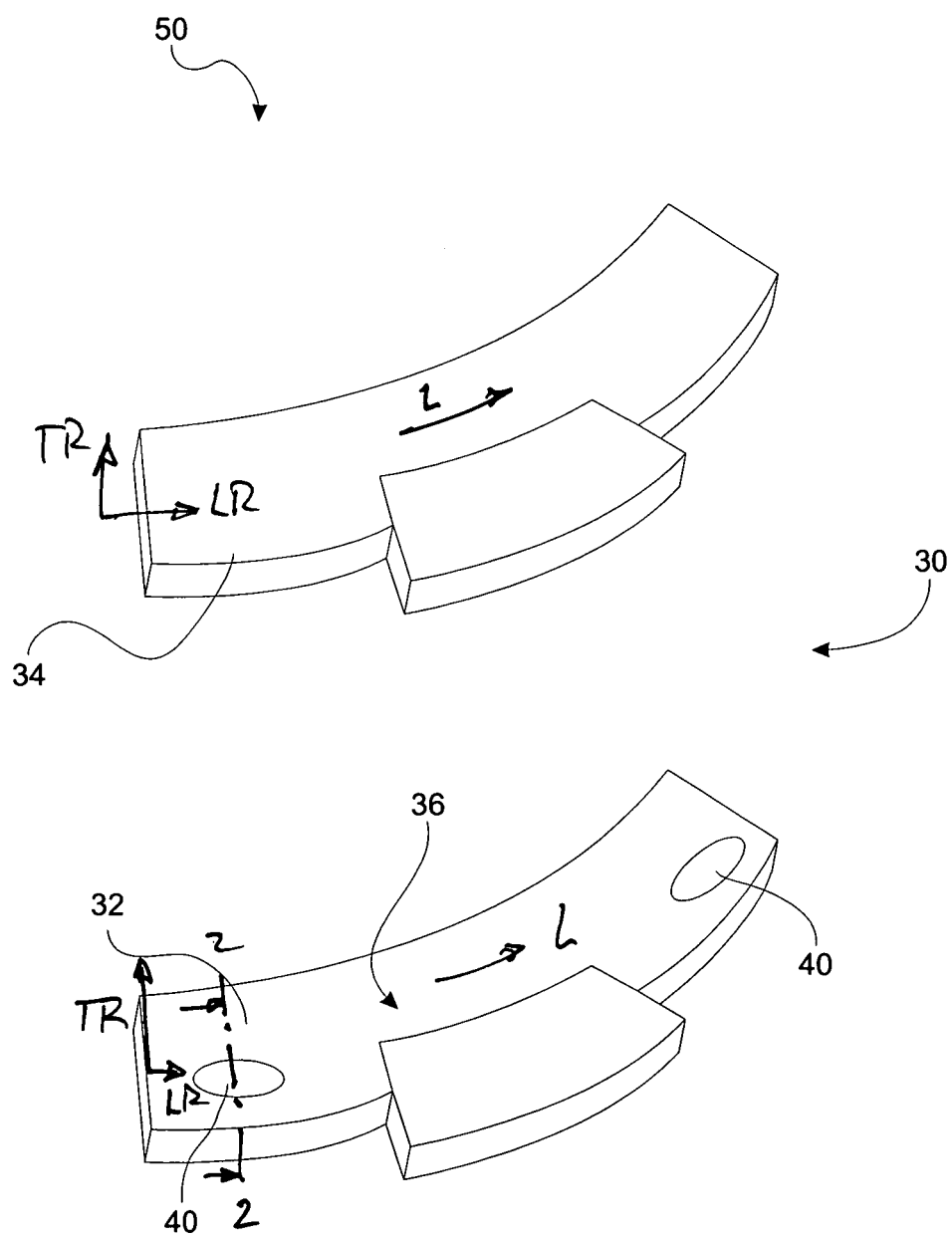
FIG. 1 shows a perspective representation of an embodiment of an inventive manufacturing device with a first and a second molding tool part.

FIG. 1 shows part of a first embodiment of the inventive manufacturing device 50. For the first step of the method, this device 50 features a mold or molding tool 30 that comprises two partial molds or molding tool parts 32 and 34. In this case, the second molding tool part 34 is illustrated in an exemplary fashion as an upper molding tool part and the first molding tool part 32 is illustrated in an exemplary fashion as a lower molding tool part. The lower molding tool part 32, in particular, may be mounted on a tool mounting device and therefore be arranged stationary.

Particularly the lower molding tool part 32 features a first contouring surface 36 that is realized, in particular, in such a way that its shape is to be described three-dimensionally in its planar expanse. The contouring surface 36 of the lower molding tool part 32 optionally features, in particular, at least one elevation and/or depression, by means of which corresponding complementary partial shapes of the component to be manufactured are formed. In order to further elucidate the invention, a local coordinate system that can be shifted along the generally curved longitudinal direction L or principal direction of the molding tool and has a lateral direction TR and a longitudinal direction LR as coordinate axes is illustrated in FIG. 1. This lateral direction TR and a longitudinal direction LR as coordinate axes can also be used for the interior trim component to be manufactured because at least their general shape illustrated in the figures corresponds to the manufacturing device. FIGS. 2 to 5 show a section through the respective molding tool parts 32, 34 that extends transverse and, in particular, vertical to the longitudinal direction L or LR, respectively.

The molding tool parts 32 and 34 of the mold 30 according to the embodiment illustrated in FIG. 1 serve for manufacturing an instrument panel for a motor vehicle. In this case, the mold 30 only shows part of the trim component section or interior trim component to be manufactured for the instrument panel. This part, in particular, represents the area that subsequently lies at the abutting edge between the instrument panel and the front windshield. This area is exactly the area that should be covered with a film.

The lower first molding tool part 32 is realized with two elevations 40 that have an essentially oval cross section. The first molding tool part 32 illustrated in FIG. 2 has two depressions 40 that correspond to the depressions illustrated in FIG. 1, but only one depression 40 is illustrated in this figure due to the sectional representation. During the injection molding process, these depressions 40 form elevations of complementary shape in the injection-molded part to be manufactured or the interior trim component to be manufactured, respectively. The first contouring surface 36 of the first molding tool part 32 may alternatively or additionally feature, in particular, at least one elevation that forms a depression of complementary shape in the injection-molded part to be manufactured or the interior trim component to be manufactured, respectively. Loudspeakers are subsequently installed into these holes. FIG. 1 shows the mold 30 in an exploded view. The second molding tool part 34 is attached to the first molding tool part 32 such that the mold 30 is closed in order to carry out the injection molding process.

The first injection molding step of one possible variation of an inventive method is described below with reference to the following figures.

Figure 2:
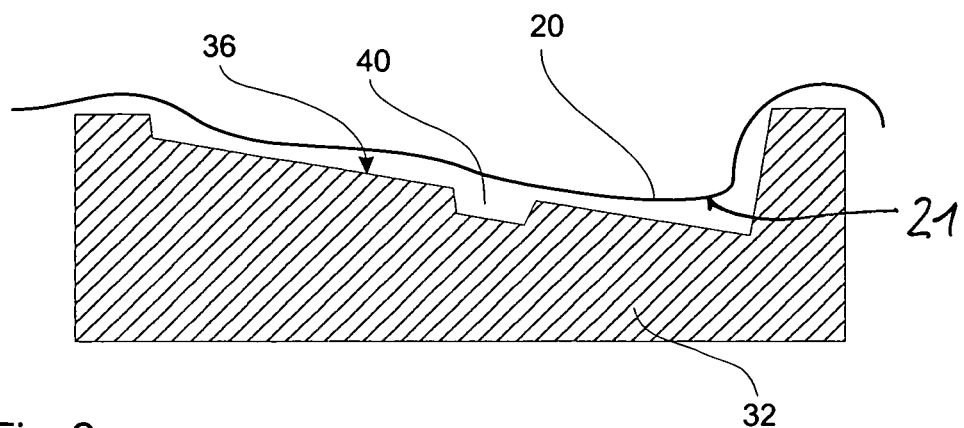
FIG. 2 shows a sectional representation of another embodiment of the first molding tool part of the inventive manufacturing device, as well as an illustration of the first step of the inventive method, wherein a similar manufacturing device is shown in the form of a section along the line 2-2 in FIG. 1.

FIG. 2 shows the first molding tool part 32 while it is still open, i.e., without a second molding tool part 34 attached thereto. A film 20 is placed into this first molding tool part 32. In this case, the first molding tool part 32 features a depression 40 that respectively corresponds to and produces elevations on the injection-molded part to be manufactured. During the placement of the film 20 into the first molding tool part 32, it needs to be observed that the film 20 covers all coverage areas 36. It also needs to be observed that the film 20 protrudes over the first molding tool part 32 in all areas. Although advantageous, this is not necessary in every method. Subsequently, the film 20 is fixed in the first molding tool part 32 such that it is essentially no longer able to move relative to the first molding tool part 32. The only remaining freedom of motion is a movement of the film 20 in the direction of the molding tool part 32, i.e., the placement of the film 20 against the first molding tool part 32.

Figure 3:
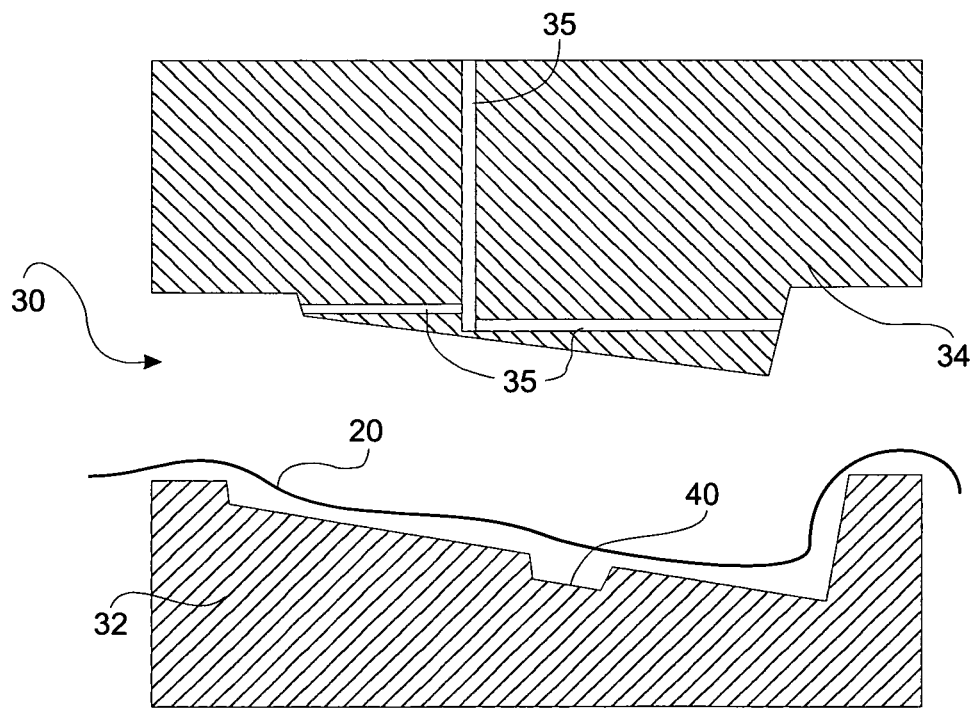
FIG. 3 shows an analogous sectional representation of the first molding tool part of the embodiment according to FIG. 2 and of an embodiment of the second molding tool part of the inventive manufacturing device along the line 2-2 in FIG. 1, as well as an illustration of another step of the inventive method.

FIG. 3 shows the next step of this method. After the film 20 has been positioned, a second molding tool part 34 is prepared for being attached to the first molding tool part 32 with the film 20 placed therein. During this attachment, FIG. 3 already shows that the second molding tool part 34 features material channels 35 for the in-mold lamination of the film 20. The first molding tool part 32 and the second molding tool part 34 are closed and therefore jointly form the complete mold 30.

Figure 4:
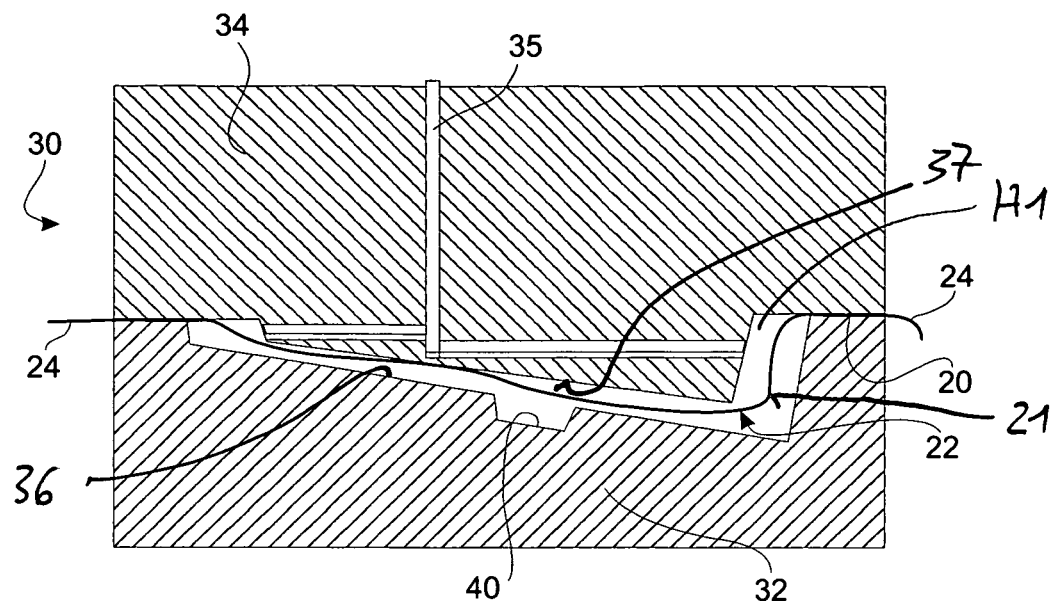
FIG. 4 shows the first and the second molding tool part of the inventive manufacturing device in the form of a sectional representation according to FIG. 3, as well as an illustration of another step of the inventive method.

The mold 30 is illustrated in its closed state in FIG. 4. The first molding tool part 32 and the second molding tool part 34 are in the closed position and essentially abut one another in their edge regions. However, the contact surfaces are separated from one another in the coverage area 36 by the film 20 arranged in between. The closed state of the mold 30 shows quite clearly that the film 20 forms a projection 24 that protrudes beyond the mold 30 on both sides of the mold 30. This also visually indicates that the film completely covers the required coverage area within the mold 30. The film 20 is still fixed within the mold 30, but free to move toward the first molding tool part 32.

Figure 5:
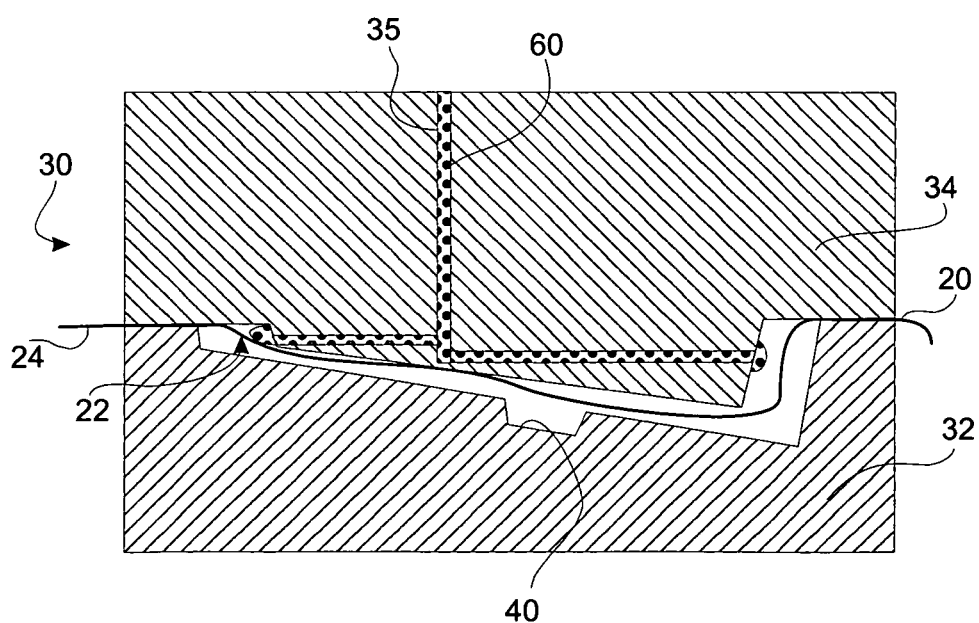
FIG. 5 shows the first and the second molding tool part of the inventive manufacturing device in the form of a sectional representation according to FIG. 3, as well as an illustration of another step of the inventive method.

FIG. 5 shows the beginning of the injection molding process. Material 60 is routed through the second injection molding part 34 via the material channel 35. The material 60 is discharged from two openings in the volume between the film 20 and the second molding tool part 34. In this case, the material 60 being discharged is subjected to a certain injection molding pressure, the intensity of which may differ depending on the method and the desired processing speed, processing temperature and material selection. Subsequent to the situation illustrated in FIG. 5, liquid material 60 continues to flow out of the openings of the material channels 35 of the second molding tool part 34 and continues to fill the space between the film 20 and the molding tool part 34.

Figure 6:
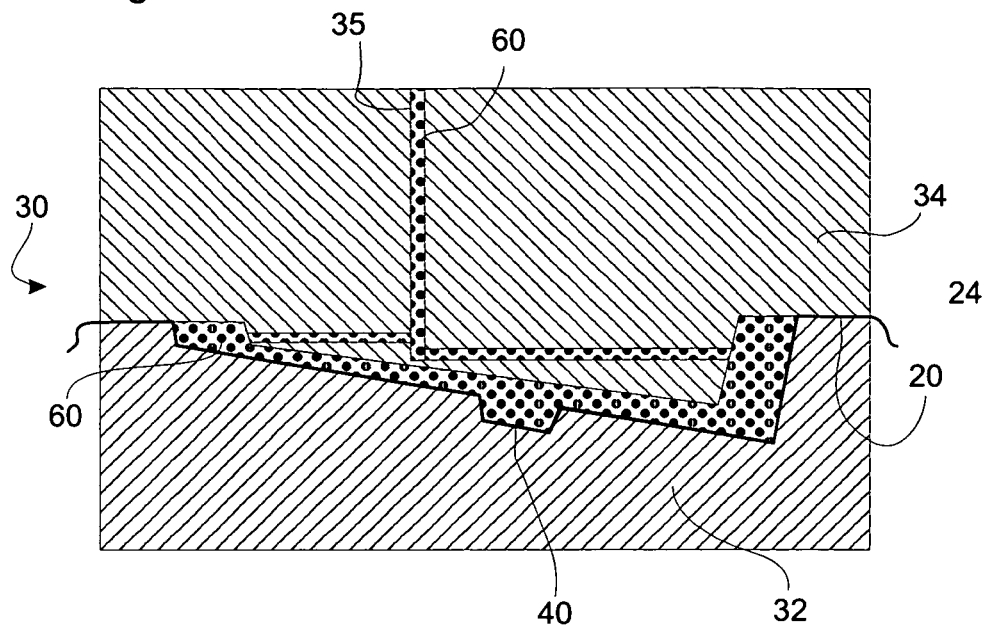
FIG. 6 shows an analogous sectional representation of the first and the second molding tool part of the inventive manufacturing device along the line 2-2 in FIG. 1, as well as an illustration of another step of the inventive method.

The end of this injection molding process is illustrated in FIG. 6. In this case, the volume between the film 20 and the molding tool part 34 is completely filled with material. The material channel 35 also is still filled with material 60. This figure also shows that the entire film 20 has been placed against the lower molding tool part 32 due to the pressure of the inflowing material 60 that, in particular, has also filled out the depression 40. In the coverage area with the film 20, the first molding tool part 32 has a surface structure that the forms a surface structure on the film 20 due to plastic deformation. After the entire system has cooled down, the two molding tool parts 32 and 34 can be separated and the trim component section 12 can, in a manner of speaking, be removed from the mold.

Figure 7:
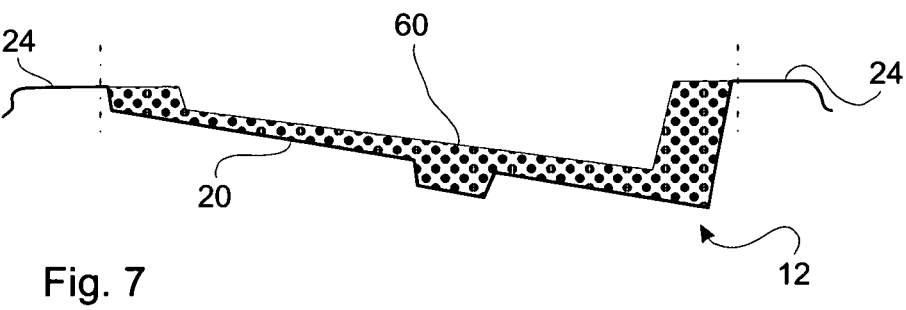
FIG. 7 shows a semi-finished trim component section that was removed from the mold parts.
Figure 8:
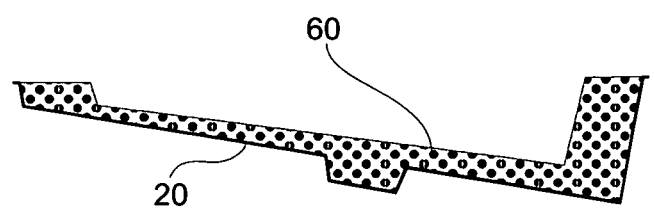
FIG. 8 shows an additionally processed first trim component section.

FIG. 7 shows the first trim component section 12 after it was removed from the mold. It comprises cooled injection molding material 60 that is completely covered with the film 20 on the visible face that represents the underside in FIG. 7. The film 20 still features the projections 24 that protrude beyond the mold 30 as illustrated in FIG. 6. An optional post-processing step may be carried out at this point. This optional post-processing step serves for removing the projections 24 along the broken lines illustrated in FIG. 7, for example, for cutting off said projections. This optional post-processing step results in a trim component section 12 of the type illustrated in FIG. 8.

Figure 9:
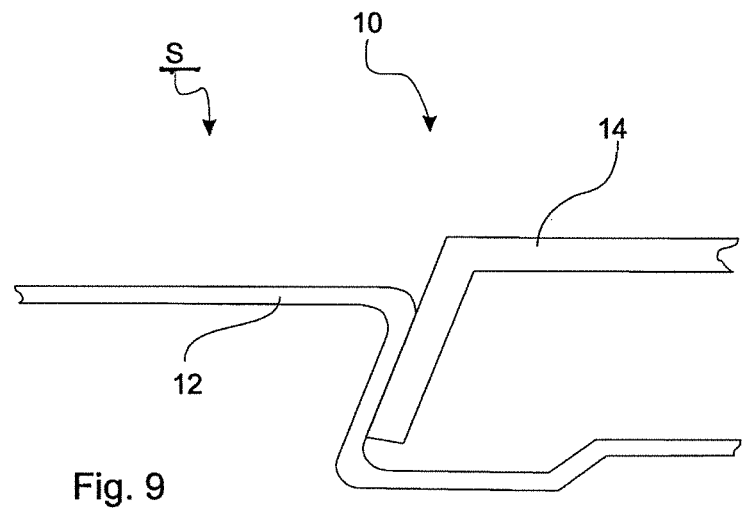
FIG. 9 shows an embodiment of an interior trim component.
Figure 10:
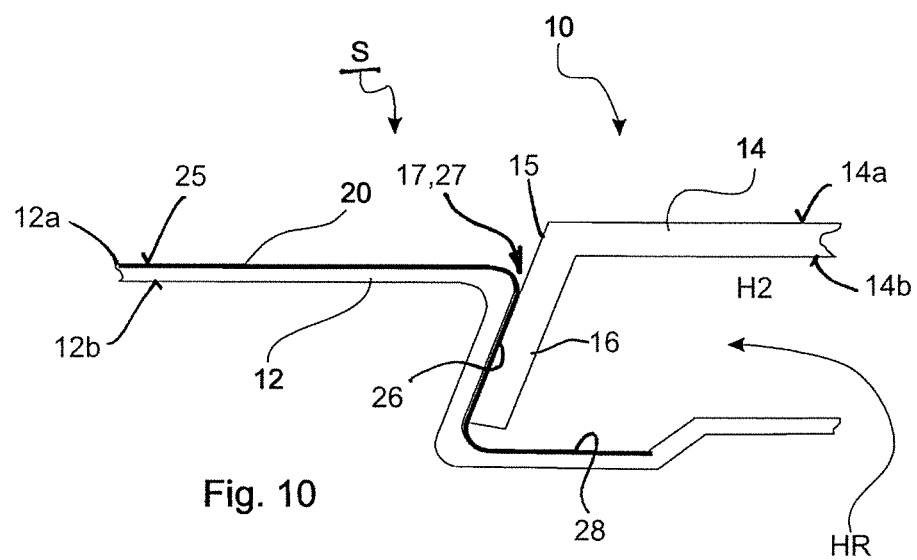
FIG. 10 shows an embodiment of an inventive interior trim component.

FIGS. 9 and 10 respectively show an interior trim component 10, wherein FIG. 9 shows an embodiment of the inventive interior trim component without a film 20 and FIG.

10 shows another embodiment of the inventive interior trim component with a film 20. In this case, FIG. 10 shows an interior trim component 10 that basically has a design similar to that illustrated in FIG. 9, but only the film 20 of the first trim component section 12 is visible in FIG. 10. In this case, the structure and the material of the first trim component section 12 are invisible for the user from the visible face S. In order to additionally improve the invisibility, the second trim component section 14 is pushed against the first trim component section 12 in such a way that the film 20, in a manner of speaking, intersects with the second trim component section 14. This intersection results in only the second trim component section 14, as well as the film 20, being visible for a passenger of the motor vehicle from the visible face S. With conventional interior trim components 10 of the type illustrated in FIG. 9, the second trim component section 14 and the raw material of the first trim component section 12 were visible for a passenger of the motor vehicle from the visible face S.

FIG. 10 shows a second step of an inventive method, namely the selective back-foaming of the second trim component section 14. In this case, the back-foaming material is injected into the area between the first trim component section and the second trim component section 14. This back-foaming material serves for filling out the volume, as well as for maintaining a certain elasticity in order to produce pleasant and, in particular, soft and high-quality haptics when pressure is exerted upon the second trim component section 14. These haptics are achieved with a back-foaming material that produces elastic foam under operating conditions.

The second trim component section 14 has an outer side 14a that sectionally serves as a visible face and a rear side 14b that lies opposite of this outer side. Analogously, the first trim component section 12 has an outer side 12a that sectionally serves as a visible face and a rear side 12b that lies opposite of this outer side. If the tool 30 and its contouring surfaces are realized accordingly, the trim component sections 12, 14 are realized and arranged in such a way that the second trim component section 14 forms a first exposed visual side section 15 and a connecting or end section 16 that is in contact with a connecting section 26 of the film 20 on the outer side 14a, wherein a cavity H2 for at least sectionally back-foaming and connecting the first and the second trim component section 12, 14 is sectionally formed between the rear side 14b of the second trim component section 14 and the first trim component section 12. The preferred back-foaming direction HR extends in the direction toward the connecting area 16, 26 of the trim component sections 12, 14.

In the embodiment according to FIG. 10, the first trim component section 12 has a stepped shape in the cross section extending transverse to the longitudinal direction L and/or the lateral direction TR, wherein this stepped shape respectively extends in the lateral direction or vice versa. In this case, the depth of the step is formed by the connecting area 26 of the film and the corresponding subjacent section of the first trim component section 12. This makes it possible to realize a largely uniform contour without any particular or small steps (i.e., less than 2 mm) between the visual side section 25 of the first trim component section 12 and the visual side section 15 of the second trim component section 14. In addition, a transition line 27 is defined on the film and a transition line 17 is defined on the second trim component section 14.

Figure 11:
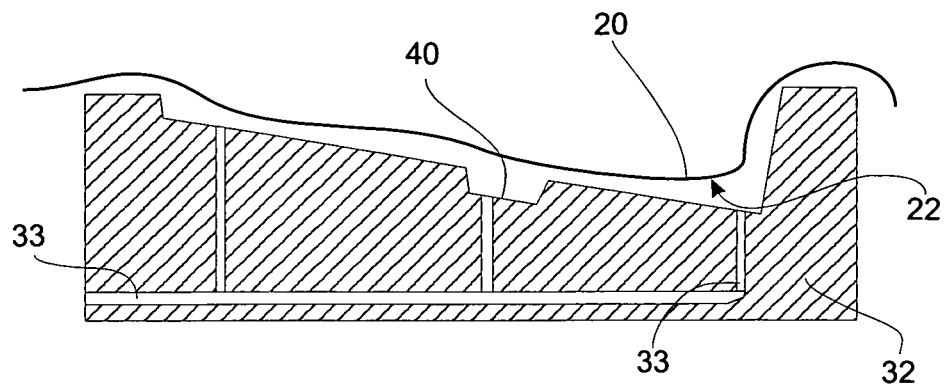
FIG. 11 shows an alternative embodiment of an inventive process step.
Figure 12:
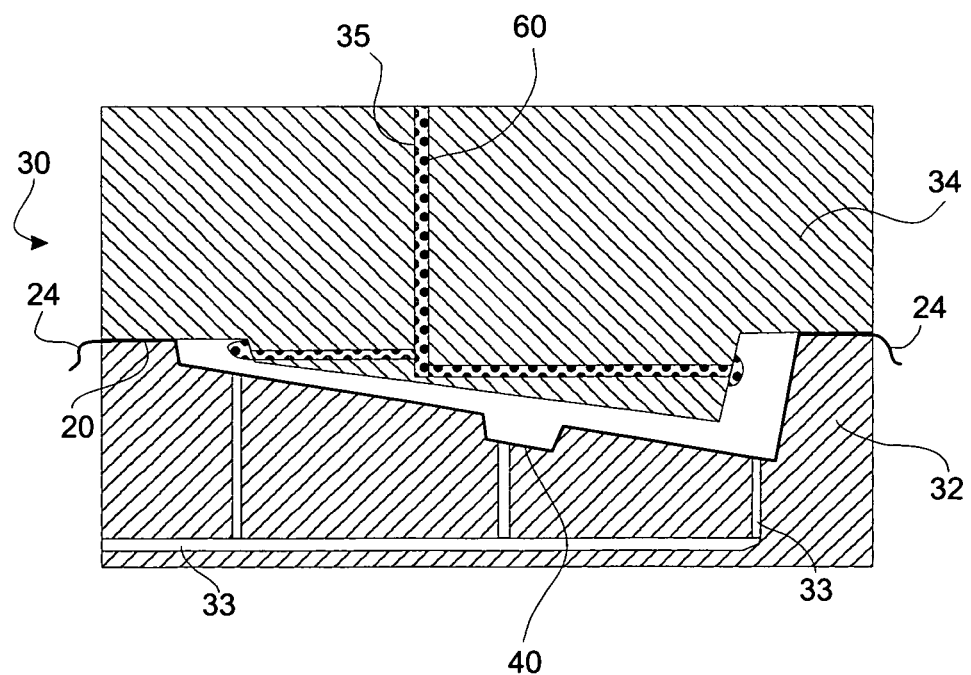
FIG. 12 shows another step of the method according to FIG. 11.

FIGS. 11 and 12 show an alternative method with respect to the injection molding step. In this case, the first molding tool part 32 additionally features air channels 33 that lead into the space between the film 20 and the first molding tool part 32. In this case, the film 20 is practically placed against the first molding tool part by means of suction on its first side 22 that subsequently points to the visible face S of the interior trim component 10. In this respect, FIG. 12 clearly shows how the film 20 is already placed against the first molding tool part 32 by means of suction before the space between the film 20 and the second molding tool part 34 is completely filled out. This ensures that the film 20 is placed against the first molding tool part 32 without creases and the material 60 can simultaneously be introduced through the material channels 35 of the second molding tool part 34 much slower and, in particular, with reduced pressure.

The invention claimed is:

1. An instrument panel comprising:
    a film with a first visible side and a rear side lying opposite to the visible side;
    a first trim component section for disposition at a front windshield of a vehicle body, comprising a supporting structure and the film, wherein the film is disposed on the supporting structure in such a way that the rear side of the film lies adjacent to the supporting structure, wherein the first trim component section includes a step and wherein the film is at an outer side of the first trim component section, with a connecting section of the film being disposed in the step,
    a second trim component section which forms a border of display elements and which comprises: an outer side comprising a visible face of the second trim component section, and a rear side that faces away from the outer side, wherein the second trim component section is disposed at the first trim component section in such a way that the outer side of the second trim component section forms a first exposed visible face section and an end section of the second trim component section is in contact with the connecting section of the film in the step and ends in the connecting section of the film, and wherein a cavity is formed between the rear side of the second trim component section and the outer side of the first trim component section,
    wherein a surface of the film at the first visible side of the film has a reflectivity that is less than a reflectivity of the supporting structure, and,
    wherein in the cavity a foam is disposed such that the foam connects at least a portion of the rear side of the second trim component section to at least a portion of the outer side of the first trim component section so that the first and the second trim component sections are fixed to each other.

2. The instrument panel of claim 1, wherein the supporting structure is an injection molded material.

3. The instrument panel of claim 1, wherein the first trim component section includes a foam made from a glass fiber-reinforced polypropylene material type with normal or short fibers (PP-GF) or a glass fiber-reinforced polypropylene material type with long fibers (LGF).

4. The instrument panel of claim 1, wherein the film features a layer of thermoplastic olefin (TPO) at least on the first visible side of the film.

5. The instrument panel of claim 1, wherein the film has a thickness between 0.2 mm and 0.7 mm.

6. The instrument panel of claim 1, wherein the supporting structure is an injection molded material comprising glass fibers, and the film covers the supporting structure so that the support structure is invisible from a visible face of the interior trim component.

7. The instrument panel of claim 1, wherein the second trim component section is formed from a dimensionally stable material.

8. The instrument panel of claim 1, wherein the step has a stepped shape with two sections of the first trim component section extending in a lateral direction with a depth of the step being formed by a subjacent section of the first trim component section that is oriented adjacently between the two laterally extending sections of the first trim component.

* * * * *